(12) United States Patent
Inoue et al.

(10) Patent No.: US 6,400,531 B1
(45) Date of Patent: Jun. 4, 2002

(54) THIN FILM MAGNETIC HEAD AND A METHOD FOR FORMING A PROTECTIVE FILM OF THE MAGNETIC HEAD

(75) Inventors: Toru Inoue; Shigeki Tanemura, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/536,613

(22) Filed: Mar. 28, 2000

(30) Foreign Application Priority Data

Apr. 8, 1999 (JP) .......................................... 11-101893

(51) Int. Cl.[7] ................................................. G11B 5/60
(52) U.S. Cl. ................................. 360/235.2; 360/235.1
(58) Field of Search ............................. 360/235.1, 235.2

(56) References Cited

U.S. PATENT DOCUMENTS 6,117,283 A * 9/2000 Chen et al. ............. 204/192.23

FOREIGN PATENT DOCUMENTS

JP         A-10-68083         3/1998

* cited by examiner

Primary Examiner—Robert S. Tupper
(74) Attorney, Agent, or Firm—Oliff & Berridge, PLC (57) ABSTRACT

A slider 1 has an opposing surface to a recording medium. Thin film magnetic heads 2 and 3 are provided on the slider 1. The slider 1 has a protective film composed of a SiN film and a surface-lubricous layer thereon.

18 Claims, 5 Drawing Sheets

THIN FILM MAGNETIC HEAD AND A METHOD FOR FORMING A PROTECTIVE FILM OF THE MAGNETIC HEAD

BACKGROUND OF THE INVENTION

1. Field of the Invention

This invention relates to a thin film magnetic head usable for a magnetically recording and reproducing device such as a magnetic disk drive device and a method for forming a protective layer on an opposing surface to a recording medium of a slider constituting the magnetic head.

2. Related Art Statement

A thin film magnetic head uses as a bearing an airflow generated from a high speed rotation of a magnetic recording disk (magnetic disk). The airflow floats the magnetic head from the magnetic disk by a minute floating height, and avoids the abrasion of the magnetic head. When the magnetic disk corrodes or an electromagnetic conversion element, loaded on a slider constituting the magnetic head, corrodes, metallic protrusions due to the corrosions are produced on the magnetic disk or the conversion element, often resulting in the fluctuation of the floating height of the slider, the abrasion of the magnetic disk or the conversion element and the destruction of the magnetically recording data in the magnetic disk because of the contact between the magnetic disk and the conversion element. For avoiding the above problems, in the past, DLC (diamond-like carbon) protective films were provided on the opposing surfaces of the slider and the magnetic disk. The DLC has the characteristics of the corrosion prevention and the enhancement of the wear resistance against the contact between the magnetic disk and the conversion element at a rotation start and a rotation stop and the contact between the minute foreign particles and the magnetic disk or the conversion element.

The DLC films has a fluorine carbon layer on its outermost surface in numerous case (Japanese Patent Application Laid-open publication Kokai Hei 10-68083:JP A 10-68083). The DLC film having such a structure lowers the surface energy and the absorption coefficient of the outermost surface thereof, which can prevent the sticking between the outermost surface and the magnetic disk or the absorption of contaminants on the outermost surface.

Since the DLC film has a resistivity of $10^{10}$–$10^{12}$ $\Omega$cm, it also maintains the electrical insulation between the slider of the thin film magnetic head and the magnetic disk when the slider and the magnetic disk contact each other.

In the magnetic disk drive device, all the aspects angles are considered for increasing a recording density. One of them is to reduce a spacing loss by decreasing the distance between the electromagnetic conversion element loaded on the slider and the magnetic disk. The reduction of the spacing loss is normally carried out through the decreasing of the floating height of the slider of the thin film magnetic head for the magnetic disk and of the thickness of the protective film. Since the decreasing of the floating height is restricted because of the contamination on the surface of the magnetic head, generally, the decreasing of the thickness of the protective film may be carried out effectively.

The DLC film, however, has a poor adhesion for the slider surface. It is known as a means for enhancing the adhesion of the DLC film to form an adhesive layer between the surface of the slider and the DLC protective layer. At present, the adhesive layer is composed of an $\alpha$-Si (amorphous silicon). The adhesive layer made of the $\alpha$-Si does not have a thickness of not more than 2 nm so that it can have uniform thickness. The thickness of the adhesive layer determines the total thickness of the protective layer. Moreover, if the protective layer to be formed on the adhesive layer is thinner, the electric insulation between the slider and the magnetic disk can not be maintained when they are contacted. Thus, on account of the above reason, the reducing of the thickness of the DLC protective layer is restricted and thereby, the reducing of the spacing loss and the enhancement of the recording density come to a deadlock.

SUMMARY OF THE INVENTION

It is an object of the present invention to provide a thin film magnetic head with a protective film having a small spacing loss and suitable for a high density recording and a method for forming the protective film.

It is another object of the present invention to provide a thin film magnetic head with a protective film without an adhesive layer having a mechanical strength equal to or more than that of a DLC and a method for forming the protective film.

It is still another object of the present invention to provide a thin film magnetic head in which dusts are unlikely to be absorbed and the slider constituting the magnetic head and a recording medium are unlikely to be stuck each other and a method for forming a protective film usable for the magnetic head.

It is further object of the present invention to provide a thin film magnetic head having a small surface-friction coefficient and a method for forming a protective film usable for the magnetic head.

To iron out the above problems, thin invention relates to a thin magnetic head comprising a slider having an opposing surface to a medium, at least one magnetic conversion element supported by the slider and a protective film comprising of a SiN film and a surface-lubricous layer.

An ideal protective has an adhesive layer for the surface of the slider, an intermediate layer having a large mechanical strength and a surface layer having a small absorption coefficient and a small friction coefficient. However, the above problems in using the DLC protective film arises from the adhesive layer between the protective layer and the slider surface. The problems are ironed out by using a protective film without an adhesive layer which has a mechanical strength equal to or more than that of the DLC protective film.

The inventors has found out that a SiN film is suitable for the protective film, which can iron out the above problems. The SiN film has a good adhesion for the material constituting the slider of the thin film magnetic head. Thus, the protective film does not have need of an adhesive layer, so that the thin film magnetic head can have the protective film without an adhesive layer with a mechanical strength more than that of the DLC protective film.

Since the SiN film has a larger hydrophile than that of the DLC film or a water-repellent DLC film, without any processing, the absorption of dust, the sticking between the slider and a recording medium and the increase of the surface-friction coefficient, etc. are likely to occur. These problems are ironed out by forming a lubricous layer on the surface of the SiN film (hereinafter, often called as a "surface-lubricous layer"). That is, the lubricous layer formed on the surface of the SiN film almost never absorb dusts and stick the slider to the recording medium, leading to the production of the thin film magnetic head having a small friction coefficient. The surface-lubricous layer is required to satisfy the conditions of having a small surface energy for preventing surface-absorption and the occurrence of a shearing at a friction boundary, not in the lubricous layer itself, etc. Although the surface-lubricous layer may be made of a liquid lubricous material such as polyfluoroether or a solid lubricous material such as graphite and hexagonal boron, it is preferably composed of a property modified layer in the outermost surface of the protective film itself. The property-modified layer may be composed of a $SiO_2$ film or a fluorocarbon layer (CF film) formed in the top of the protective film. Of them, the CF film is more favorable because it can have a small surface-absorption coefficient and its extremely thin thickness.

The CF film has difficulty in being formed on the top of the SiN film by using a fluorine plasma as in forming the DLC film, because SiF is energetically stable. Accordingly, the CF film having a thickness of not more than 1 nm is directly formed on the SiN film.

The protective film may have an intermediate layer. The intermediate layer exists between the SiN layer and the surface-lubricous layer, composed of the constituting atoms of the SiN layer and the surface-lubricous layer and have a thickness of 0.3–0.5 nm.

In the forming method of the protective film according to the present invention, the SiN film is formed on the opposing surface to a recording medium of the thin film magnetic head by an ECR sputtering method.

Although it is known in the Japanese Patent Application Kokai Hei 63-91814:JP-A 63-91814) that the SiN film is employed for the protective film of the thin film magnetic head, the SiN film is formed by a CVD method or a sputtering method. The CVD- or sputtering-formed SiN film can not have a mechanical strength equal to or more than that of the DLC film.

On the contrary, the ECR sputtering-formed SiN film can have a mechanical strength equal to or more than that of the DLC film and have a thinner thickness than that of the DLC film.

In the present invention, a surface-lubricous layer containing a compound of carbon and fluorine is formed on the surface of the SiN film.

The other objects, configurations and advantages will be explained in detail, with reference to the attaching drawings in embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

<A Thin Film Magnetic Head>

Figure 1:
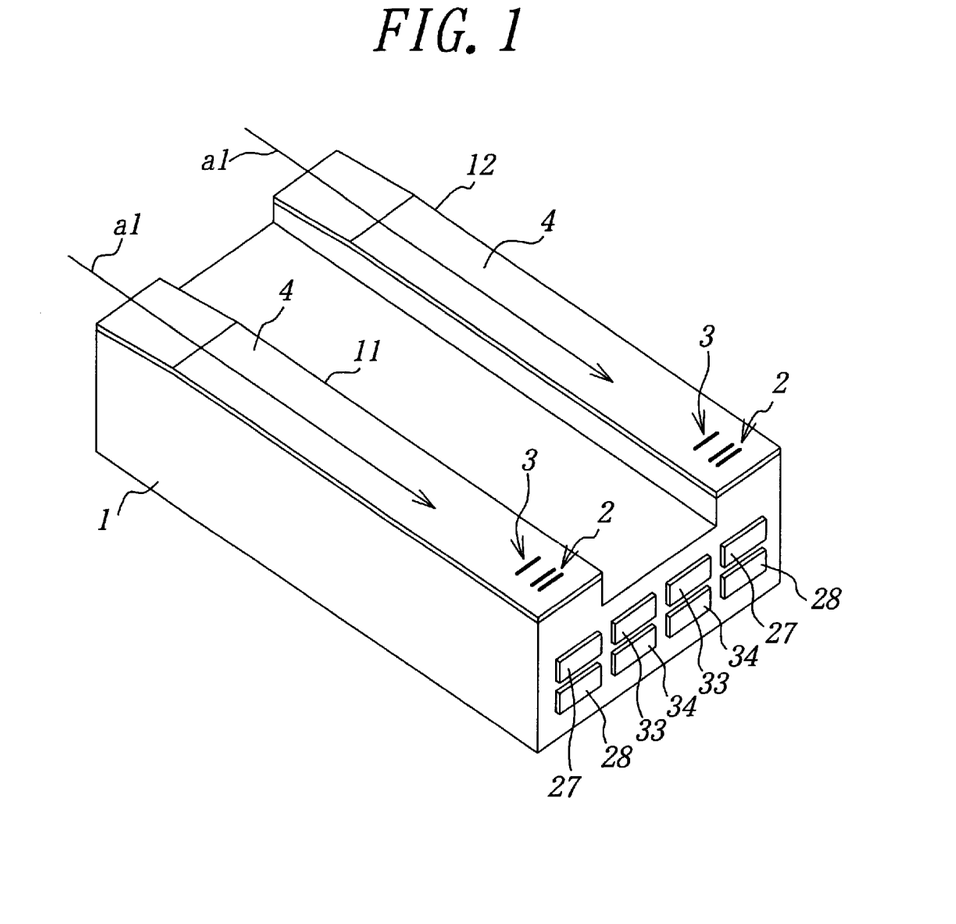
FIG. 1 is a perspective view of the thin film magnetic head according to the present invention.
Figure 2:
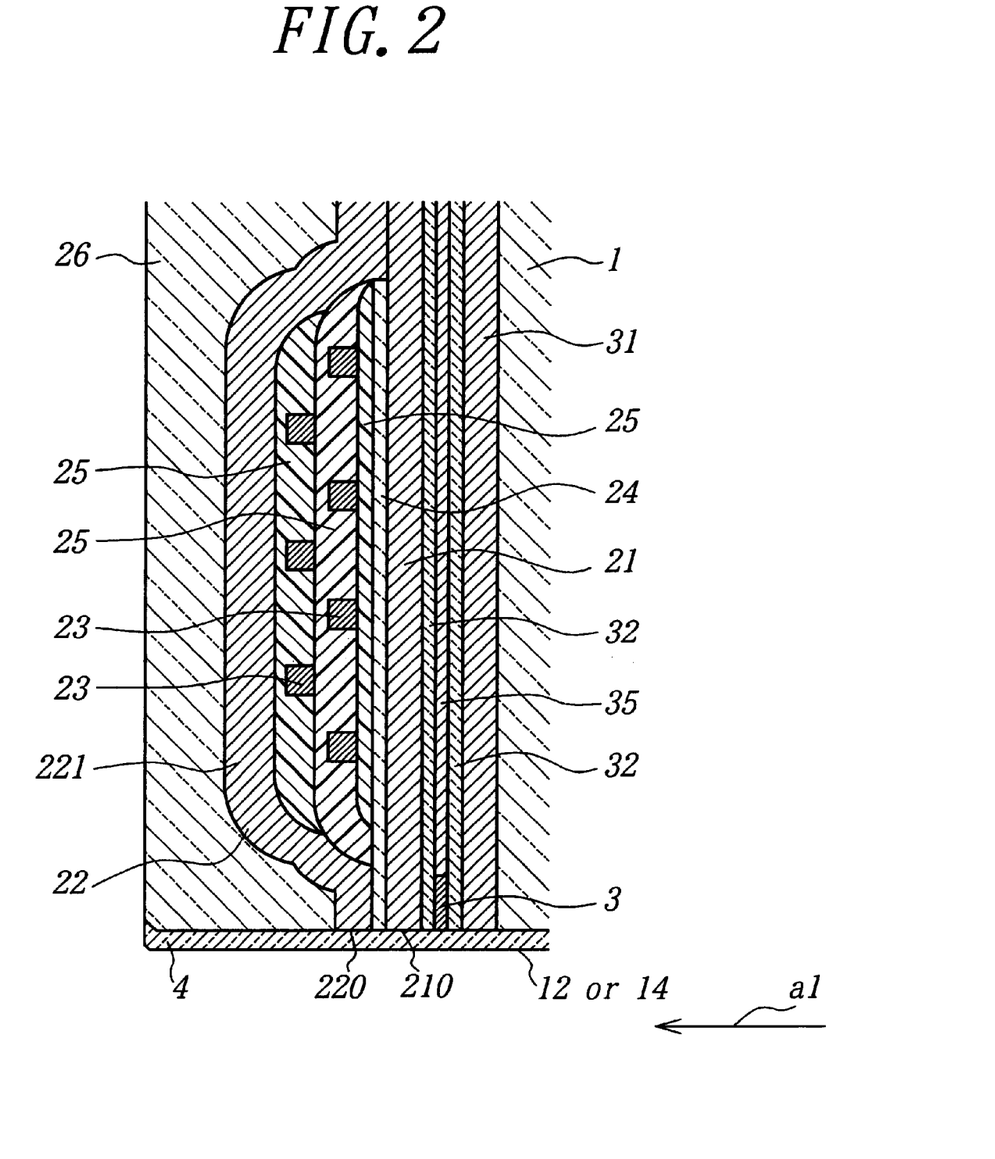
FIG. 2 is a cross sectional view of the thin film magnetic head according shown in FIG. 1.

FIG. 1 is a perspective view of the thin film magnetic head according to the present invention and FIG. 2 is a cross sectional view of the thin film magnetic head according shown in FIG. 1. In these figures, the sizes of some parts are exaggerated. The thin film magnetic head according to the present invention in the figures includes a slider 1, at least one electromagnetic conversion element 2 and a protective film 4.

The slider 1 has rail parts 11 and 12, of which substrate surfaces 13 and 14 serve as an ABS, on its opposing surface to a recording medium. The slider 1 does not always have the two rail parts 11 and 12, and may have one through three rail parts or no rail part. Moreover, for improving its floating characteristic, the slider may have a variety of geometrically designed opposing surface. The present invention may be applied for any kind of slider.

The electromagnetic conversion element 2 has a first pole portion P1 and a second pole portion P2 of which forefronts are exposed to the substrate surfaces 13 and 14.

Figure 3:
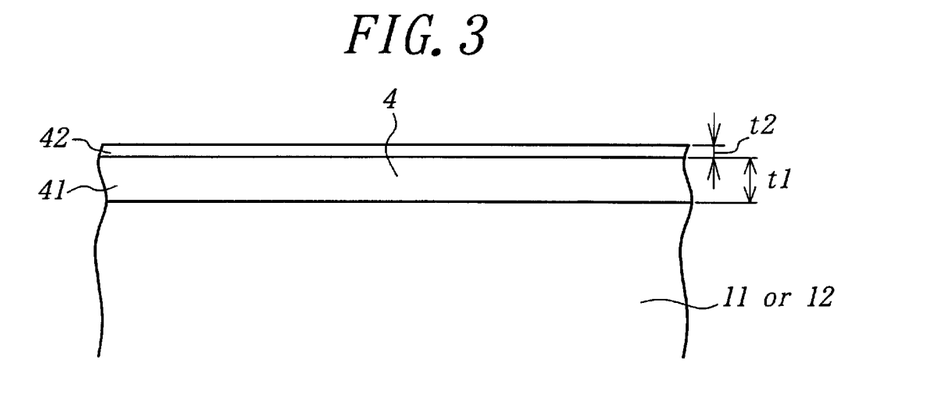
FIG. 3 is an enlarged view of a part of the thin film magnetic head shown in FIGS. 1 and 2.
Figure 4:
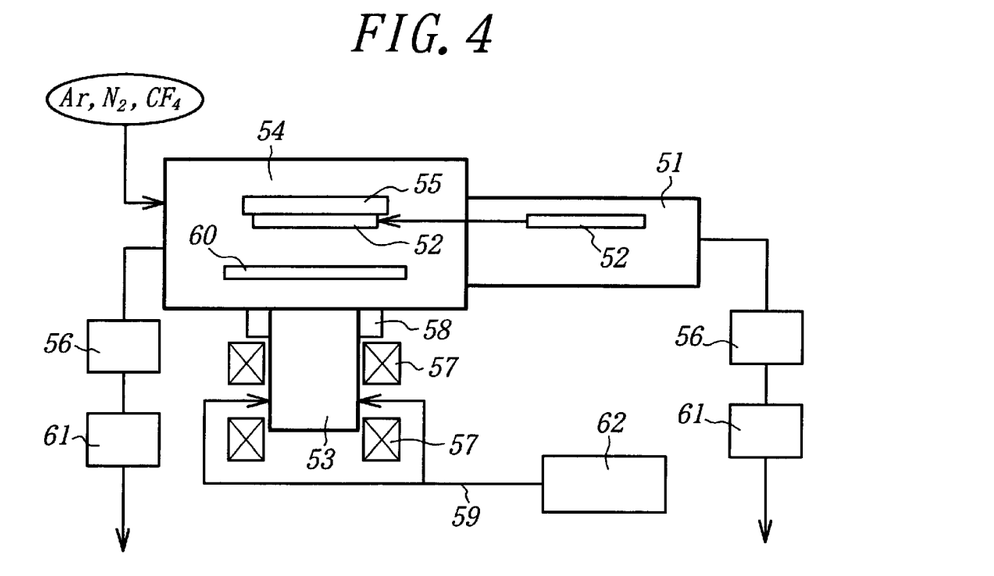
FIG. 4 is a schematic view showing an ECR sputtering equipment to be directly used in the forming method of the protective film according to the present invention.

The protective layer 4 is provided on the opposing surface to the recording medium of the slider 1. The layer 4 can exist on the whole opposing surface or only on the surfaces of the rail parts 11 and 12. The protective film 4, as shown in FIG. 4 in enlargement, includes a SiN film 41 having a surface-lubricous layer 42 on its surface. The surface-lubricous layer 42 is preferably made of a CF film. Thus, the protective film 4 is composed of the SiN/CF film-structure entirely. The SiN film 41 is film-formed, in a thickness t1 of 1–8 nm, on the opposing surface to the recording medium of the slider 1 by a ECR sputtering method.

The SiN film 41 has a good adhesion for the material constituting the slider surface such as $Al_2O_3$, magnetic metal and AlTiC. Consequently, the protective film according to the present invention does not have need of an adhesive layer, so that the thin film magnetic head according to the present invention can have the protective film 4 without an adhesive layer with a mechanical strength equal to or more than the DLC.

Moreover, the protective film 4 has the surface-lubricous layer 42, preferably made of the CF film, on the SiN film 41. The thin film magnetic head is unlikely to absorb dusts and stick the slider to a recording medium.

The practical protective film 4 has the SiN/CF film-structure composed of the SiN film 41 having a thickness t1 of 1–8 nm and the CF film 42 having a thickness t2 of 0.2–1 nm, preferably 0.5 nm on the SiN film.

This invention will be described again, with reference to FIGS. 1 to 4. In the embodiment shown in these figures, the electromagnetic conversion element 2 has a first magnetic film 21, a second magnetic film 22, a coil film 23, a gap film 24 made of alumina, etc. an insulating film 25 made of an organic resin and a protective film 26 made of alumina, etc. The forefronts of the first and the second magnetic films 21 and 22 constitute a first pole portion P1 and a second pole portion P2 opposing each other via the gap film 24, respectively. The writing for a recording medium is carried out by using the first and the second pole portions P1 and P2. The yoke parts of the first and the second magnetic films 21 and 22 are connected each other, so as to complete a magnetic circuit, in a back gap part opposite to the first and the second pole portions P1 and P2 in the magnetic films. A coil film 23 is formed on the insulating film 25 so as to vertically wind the connection part of the yokes. The both ends of the coil film 23 are electrically connected to pull-out electrodes 27 and 28 (see, FIG. 1). The wind number and the layer number of the coil film 23 is not restricted.

The thin film magnetic head in the embodiment has the inductive type electromagnetic conversion element 2 for writing and a thin film electromagnetic conversion element 3 (hereinafter, often called as a "MR element") composed of a MR element for reading. As of now, the MR element 3 having any kind of film-structure is suggested and is practically used. For example, the MR element may be composed of an anisotropic magnetic resistive effective element made of permalloy, etc., a giant magnetic resistive (GMR) effective film and a ferromagnetic tunnel effective film (TMR), etc. In the present invention, all the above film-structure may be employed. The MR element 3 is positioned on the insulating film 32 between a first shielding film 31 and the first magnetic film 21 doubling as a second shielding film. The insulating film 32 is made of alumina, etc. The MR element 3 is connected to pull-out electrodes 33 and 34 (see, FIG. 1).

The thin film electromagnetic conversion elements 2 and 3 are provided on the end portions of one or both of the rail parts 11 and 12 in a medium-moving direction a1, which corresponds to an outflow direction of an air at a high speed movement of the medium. On the end of the slider 1 in the medium-moving direction a1 are the pull-out electrodes 27 and 28 connected to the thin film electromagnetic conversion element 2 and the pull-out electrodes 33 and 34 connected to the thin film electromagnetic conversion element 3.

This invention may be applied for not only the pole portion structure of the thin film magnetic head shown in the above figures, but also any kind of pole portion structure suggested and to be suggested. For example, this invention may be applied for a multilayered pole portion structure composed of two and more layers constituting one or both pole portions in the magnetic head. In the multilayered pole portion structure, a part of the magnetic films constituting the pole portion may be receded from the opposing surface to the medium so as not to expose to the opposing surface.

<A Method for Forming a Protective Film>

Next, the forming method of the protective film according to the present invention will be explained. FIG. 4 is a schematic view showing an ECR sputtering equipment directly usable for the forming method of the protective film. The surface of the slider is cleaned by an Ar plasma, which is a foundational process in film-forming, and thereafter, the SiN film is formed by sputtering a high purity Si target with a mixed gas of an Ar gas and a $N_2$ gas. The SiN film has a thickness of 1–8 nm by the ECR sputtering method, as above-mentioned.

When the SiN film comes to a desired thickness, a CF gas is flown and the CF film as the surface-lubricous layer is formed on the SiN film. The thickness of the CF film is 0.2 nm, preferably 0.5 nm. The CF film and the SiN film are formed continuously in the same film-forming equipment. Thereby, the protective film having the SiN/CF film-structure can be obtained. As the CF gas, a variety of gas such as $CF_4$, $CH_3F$, $CH_3F$ and $CH_2F_2$ may be used. In this embodiment, the $CF_4$ gas is employed.

If a plasma containing the $CF_4$ gas is irradiated to a Si based material, the two mode step of the etching the material and the forming the CF film appears. The two mode step forms a transition layer composed of the atomic particles of the SiN film and the CF film. The transition layer can enhance the bonding between the SiN film and the CF film. The switching of the two mode step is determined by the amount of fluorine ion reaching the surface of the SiN film. Concretely, the switching may be carried out by the following methods:

(a) A method to control the amount of the reaching ion by applying a bias voltage to a sample, and (b) A method to control the amounts of the ion and the radical by varying a microwave-electric power to be applied. In following embodiment, the method (b) is employed.

The SiN film was formed on the slider 1 of the thin film magnetic head by using the ECR sputtering equipment shown in FIG. 4. In a practical process, the slider is composed of a wafer to hold many thin film magnetic head. Concretely, the SiN film was formed as follows:

First, a sample 52 prepared in a load lock chamber 51 was introduced on a stage 55 in a film-forming chamber 54. The sample 52 was fixed on a holder having a size of 3 inch-Si substrate.

A ECR chamber 53 and the film-forming chamber 54 were evacuated to given ultimate pressures by a turbo molecular pump 56 and a dry scroll pump 61. Subsequently, an Ar gas was introduced into the ECR chamber 53 and the film-forming chamber 54 up to their desired pressures for the reaction.

A two separated magnet coil 57 arranged around the ECR chamber 53 was excited by flowing a current in the coil. Thereby, the magnet coil generated a magnetic field of 0.0875 T near a target 58 around the ECR chamber. The target 58 was composed of a ring-like Si target having a purity of 99.9999%.

A electromagnetic wave (microwave) having a frequency of 2.45 GHz was introduced into the ECR chamber 53 and the film-forming chamber 54 from a microwave electric power supply 62 via a branch type rectangular waveguided tube 59. The above magnetic field satisfies an ECR condition for the frequency of the microwave and generates a high density plasma due to an Electron Cyclotron Resonance near the target 58.

Subsequently, an electromagnetic wave having a frequency of 13.56 MHz was applied for the target 58. A self-bias voltage was induced on the surface of the target 58 and thereby, the surface was sputtered.

Next, a $N_2$ gas was introduced. The flow rate ratio of the Ar gas and the $N_2$ gas was Ar gas:$N_2$ gas=4:1.

A shutter 60 was opened and the SiN film was formed in a thickness of 4.9 nm. After forming the SiN film, the shutter 60 was closed for a time. The opening time of the shutter 60 was determined beforehand by a calculated forming speed from a SiN film formed on a dummy substrate.

Subsequently, the flow rate ratio of the Ar gas and the $N_2$ gas was changed to Ar gas: $N_2$ gas=4:5 with maintaining the total amount of those gases and thereafter, the $CF_4$ gas was mixed to those Ar gas and $N_2$ gas. After a discharge became stable one minute later, the shutter 60 was opened and its open was held for 20 seconds.

Next, the $N_2$ gas was stopped and its stop was held for 20 minutes to form the CF layer. The total thickness of the SiN/CF film-structure was 5.0 nm.

Besides the above film-forming process, the SiN/CF film-structure was formed in a total thickness of 100 nm for the measurement of its hardness. The SiN/CF film-structure having a total thickness of 100 nm has the same thickness ratio of SiN layer/CF layer as that of the SiN/CF film-structure having a total thickness of 5.0 nm. Moreover, for a composition analysis, the SiN/CF film-structure was formed on a Si substrate.

The discharge and the gas-supply were stopped and the ECR chamber 53 and the film-forming chamber 54 were evacuated up to given background pressures. Then, the sample 52 was withdrawn in the load lock chamber 51 and thereafter, the load lock chamber 51 was purged to an atmosphere to take out the sample 52.

<A Composition of a Protective Film>

Figure 5:
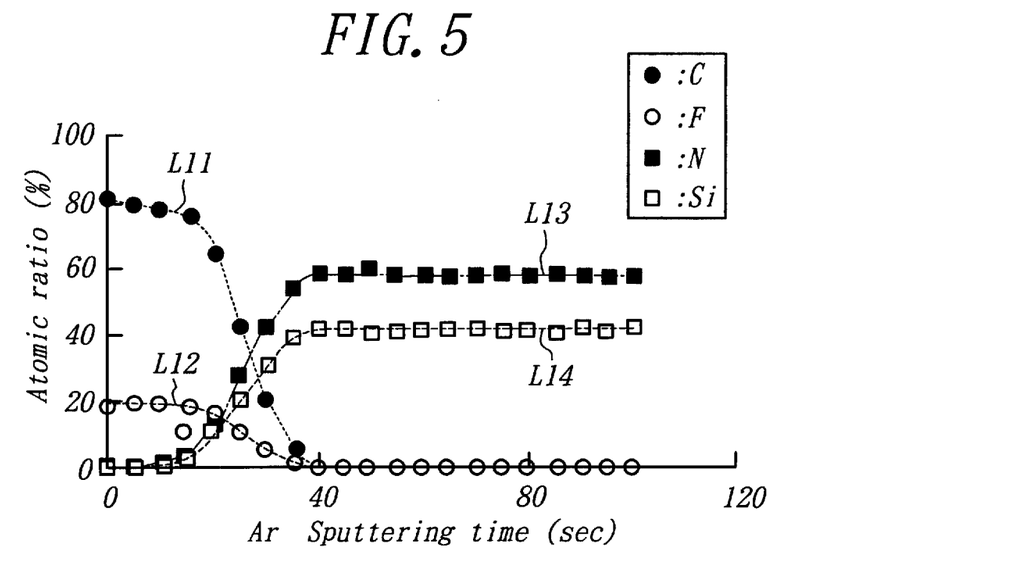
FIG. 5 is a view showing Auger profiles.

The above obtained protective film was compositionally analyzed in its depth direction by an Ar+ ion-sputtering in an Auger Electron Spectroscopy. As a standard sample for the composition analysis, a powdery SiN produced by a CVD method was employed. The results of the composition analysis were converted to their atomic percentages. FIG. 5 is a graph showing the relation between the Ar+ ion-sputtering time (second) and the atomic percentage (%), what is called, an Auger profile. The Ar+ ion-sputtering time is almost proportional to the depth from the surface of the protective film toward the surface of the substrate. In FIG. 5, the curves L11–L14 presents the relations in carbon, fluorine, nitrogen and silicon, respectively.

The profile shown in FIG. 5 exhibits that the CF film having an atomic composition of C:F=8:2 exists up to in the depth corresponding to the sputtering time=20 seconds from the surface of the protective film. Moreover, it shows that the nitrogen and silicon increase toward the surface of the substrate from that depth point and a stoichiometric $SiN_4$ film having an atomic composition of Si:N=4.2:5.8 exists in the area toward the surface of the substrate.

Consequently, it was turned out that an intermediate layer composed of the atomic particles of the SiN film and the CF film is formed. It is considered from a SIMS for the same sample that the intermediate layer has a thickness of about 0.3–0.5 nm.

<A Hardness of a Protective Film>

Figure 6:
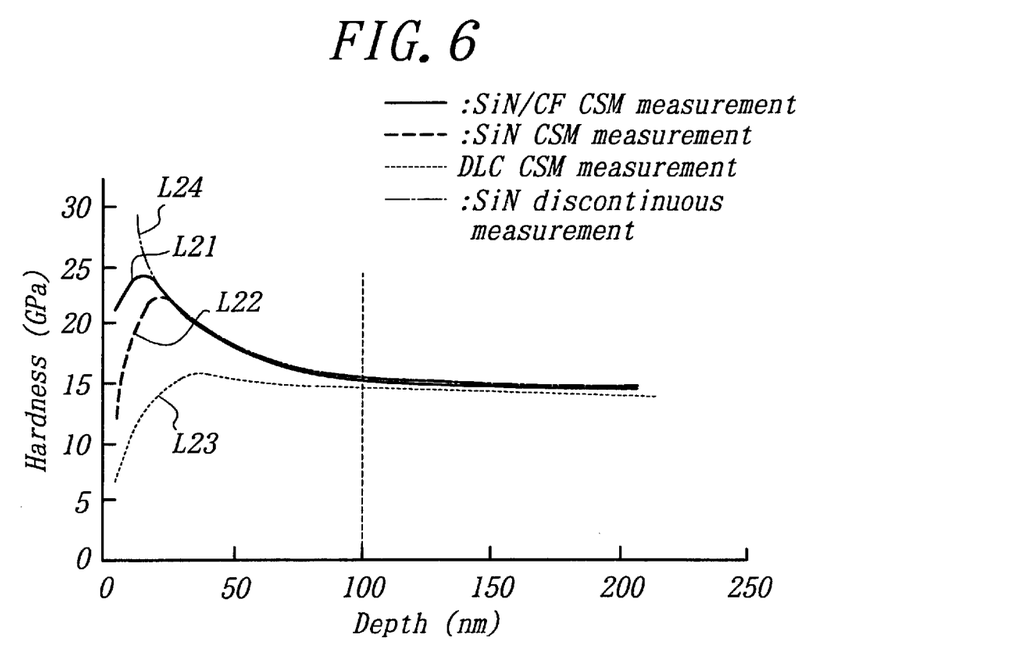
FIG. 6 is a view showing results of a hardness measurement.

FIG. 6 shows results of a hardness measurement for the protective film. In FIG. 6, the abscissa axis depicts the depth from the surface of the protective film and the vertical line depicts the hardness (GPa). The hardness measurement was carried out for the sample having the SiN/CF film-structure with a thickness of 100 nm by using a CSM (Continuous Stiffness Measurement) belonging to a indentation method (hardness measuring method). The CSM method can evaluate the hardness and the elastic modules of the protective film estimated from an inserting depth of an indentation for the film. The curve L21 shows the result of the CSM.

For comparison, the CSM were carried out for a 100 nm SiN film and a 100 nm DLC film. The curves L22 and L23 show the results for the 100 nm SiN film and the 100 nm DLC film, respectively.

A discontinuous measurement was also carried out for the 100 nm SiN film. The curve L24 in FIG. 6 shows the result of the discontinuous measurement. In the above CSM and the discontinuous measurement, a Berkovich-type single crystalline diamond was used.

As is apparent from FIG. 6, the CSM shows larger harnesses of about 22–27 Gpa in the SiN film and the SiN/CF film structure than in the DLC film. The constant hardness in the depth more than about 50 nm shows the hardness of the slider.

The SiN film has a difference in its surface-nearby measurement results by the CSM and the discontinuous measurement. In the discontinuous measurement, the hardness of the SiN film increases in the area near its surface. On the contrary, in the CSM, the hardness of the SiN film becomes lowest in the area near its surface and rises up toward the inside of the film, so that the hardness depicts a discontinuous curve versus the depth of the film. Not shown, the maximum value of the hardness of each film except the SiN/CF film-structure in the CSM is larger than that in the discontinuous measurement.

The difference in the hardness measurement results from the difference in the measurement means between the CSM and the discontinuous measurement. The discontinuous measurement applies a load constantly during its measurement, but the CSM applies a load intermittently at each point in the depth direction of the film. Thus, the absorption between the film surface and the indenter surface in the CSM becomes more conspicuous than that in the discontinuous measurement, so that in the CSM, the indenter is drawn into the outermost surface of the film by a load more than an applied load. Accordingly, although the CSM does not exhibit a true hardness of the outermost surface of the film, it can relatively compare the hardnesses and the absorption coefficients between different films.

The detail examination for the hardness measurement results in the SiN/CF film-structure and the SiN film exhibits the difference in their surface-nearby hardnesses. The SiN/CF film-structure shows a more precise hardness than the SiN film due to its decrease of the surface-absorption.

If the decrease of the surface hardness results from the hardness of the soft CF film, not the decrease of the surface-absorption, in view of the thickness of the CF film, the SiN/CF film-structure should show the maximum value of the hardness in the further surface-nearby area. Consequently, the difference in the surface-nearby hardness results from the difference in the surface-absorptions between the SiN/CF film-structure and the SiN film and the SiN/CF film-structure has a lower surface-absorption than the Si film.

<A CSS Test>

Figure 7:
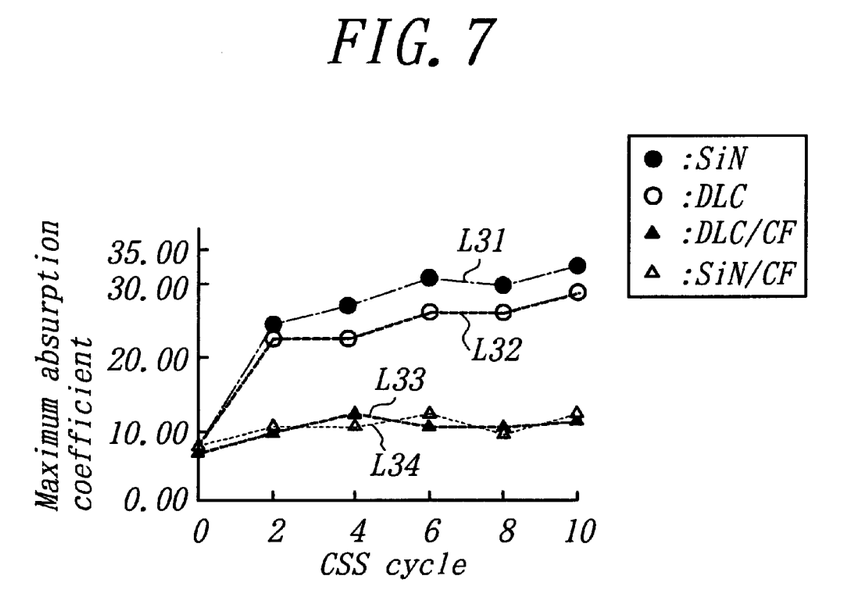
FIG. 7 is a view showing results of a CSS test.

FIG. 7 shows CSS (Contact Start Stop) test results. The CSS test results show maximum absorption coefficients between a magnetic disk and the thin film magnetic head including the protective film according to the present invention when the magnetic disk rotates from its static state in which the magnetic head is contacted to the magnetic disk. The curves L31–L34 show the maximum absorption coefficients of the magnetic heads having protective films with a 5.0 nm thickness SiN film, a 5.0 nm thickness DLC film, a 5.0 nm thickness DLC/CF film-structure and a 5.0 nm thickness SiN/CF film-structure.

As is apparent from the comparison of the curve L34 with the curves L31 and L32, the thin film magnetic head having the protective film composed of the SiN/CF film has a much smaller maximum absorption coefficient of about 9–12 than the ones having the protective films composed of the DLC film and the SiN film, respectively. Moreover, the maximum absorption coefficient is almost equal to that of the thin film magnetic head having the protective film composed of the DLC/CF film-structure.

Figure 8:
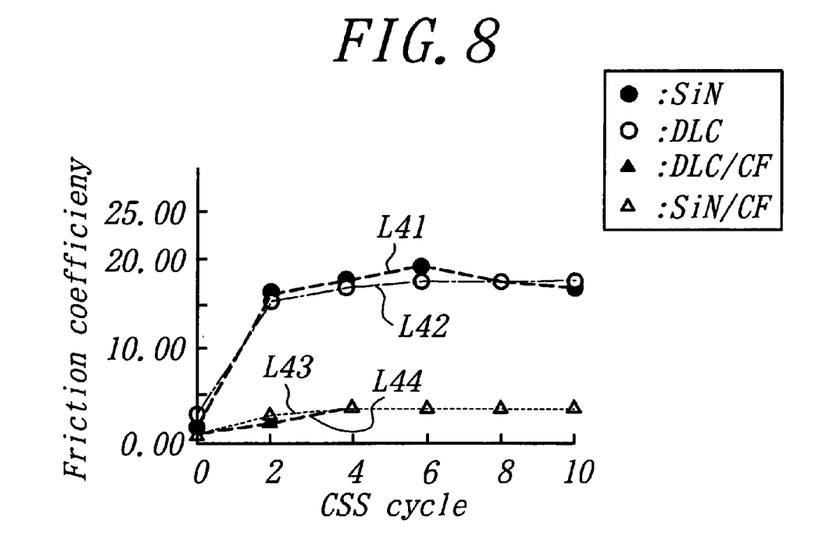
FIG. 8 is a view showing results of a CSS test.

FIG. 8 also shows CSS test results. The CSS test results are friction coefficients when the magnetic disk rotates from its static state in which the magnetic head is contacted to the magnetic disk. The CSS test were carried out by two CSS cycles. Herein, one CSS cycle is the period from the rotation start to the rotation stop. The curves L41–L44 show the friction coefficients of the thin film magnetic heads having the protective films composed of a 5.0 nm thickness SiN film, a 5.0 nm thickness DLC film, a 5.0 nm thickness DLC/CF film-structure and a 5.0 nm thickness SiN/CF film-structure, respectively.

As is apparent from the comparison of the curve L44 with the curves L41 and L42, the thin film magnetic head having the protective film composed of the SiN/CF film has a much smaller friction coefficient than the ones having the protective films composed of the DLC film and the SiN film, respectively. Moreover, the friction coefficient is almost equal to that of the thin film magnetic head having the protective film composed of the DLC/CF film-structure.

Concretely, the thin film magnetic heads having the protective films composed of the DLC film and the SiN film has a friction coefficients of 15–25 and the magnetic head having the SiN/CF film-structure protective film has a friction coefficient of 4–7.

This invention is not limited to the above embodiments and every kind of variation and modification may be made without departing from the scope of the present invention. For example, in the above embodiments, although the mask to define the thin film pattern is composed of the photoresist frames, it may be an silicon oxide mask or a silicon nitride mask.

As above-mentioned, the following effects can be obtained, according to the present invention.

(a) The thin film magnetic head with a protective film having a small spacing loss and suitable for a high density recording and a method for forming the protective film can be provided.

(b) The thin film magnetic head with a protective film having a mechanical strength equal to or more than that of a DLC without an adhesive layer and a method for forming the protective film can be provided.

(c) The thin film magnetic head in which dusts are unlikely to be absorbed and the slider constituting the magnetic head and a recording medium are unlikely to be stuck each other and a method for forming a protective film usable for the magnetic head can be provided.

(d) The thin film magnetic head having a small surface-friction coefficient and a method for forming a protective film usable for the magnetic head can be provided.

What is claimed is:

1. A thin magnetic head comprising a slider having an opposing surface to a medium, at least one magnetic conversion element supported by the slider, a protective film comprised of a SiN film, and a surface-lubricous layer, the SiN layer being located on the slider medium opposing surface, the surface-lubricous layer being located on the SiN layer.

2. A thin film magnetic head as defined in claim 1, wherein the protective film has a hardness of 22–27 GPa.

3. A thin film magnetic head as defined in claim 1, wherein the protective film has a maximum absorption coefficient of 9–12 in a contact-start/stop test.

4. A thin film magnetic head as defined in claim 1, wherein the protective film has a friction coefficient of 4–7 in a contact-start/stop test.

5. A thin film magnetic head as defined in claim 1, wherein the SiN film has a thickness of 1–8 nm.

6. A thin film magnetic head as defined in claim 5, wherein the surface lubricous layer has a thickness of 0.2 nm.

7. A thin film magnetic head as defined in claim 1, wherein the surface-lubricous layer is composed of a compound made of carbon and fluorine.

8. A thin film magnetic head as defined in claim 1, wherein the protective film has, between the SiN film and the surface lubricous layer, an intermediate film composed of constituting elements of the SiN film and the surface-lubricous layer.

9. A thin film magnetic head as defined in claim 8, wherein the intermediate film has a thickness of 0.3–0.5 nm.

10. A thin film magnetic head as defined in claim 2, wherein the SiN film has a thickness of 1–8 nm.

11. A thin film magnetic head as defined in claim 3, wherein the SiN film has a thickness of 1–8 nm.

12. A thin film magnetic head as defined in claim 4, wherein the SiN film has a thickness of 1–8 nm.

13. A thin film magnetic head as defined in claim 2, wherein the surface-lubricous layer is composed of a compound made of carbon and flourine.

14. A thin film magnetic head as defined in claim 3, wherein the surface-lubricous layer is composed of a compound made of carbon and flourine.

15. A thin film magnetic head as defined in claim 4, wherein the surface-lubricous layer is composed of a compound made of carbon and flourine.

16. A thin film magnetic head as defined in claim 2, wherein the protective film has, between the SiN film and the surface lubricous layer, an intermediate film composed of constituting elements of the SiN film and the surface-lubricous layer.

17. A thin film magnetic head as defined in claim 3, wherein the protective film has, between the SiN film and the surface lubricous layer, an intermediate film composed of constituting elements of the SiN film and the surface-lubricous layer.

18. A thin film magnetic head as defined in claim 4, wherein the protective film has, between the SiN film and the surface lubricous layer, an intermediate film composed of constituting elements of the SiN film and the surface-lubricous layer.

* * * * *